April 5, 1966  W. D. MYERS  3,244,232
PRESSURE ACTUATED PUSHING APPARATUS
Filed April 15, 1963  6 Sheets-Sheet 1
Fig. 1a. Fig. 1b. Fig. 1c. Fig. 1d.
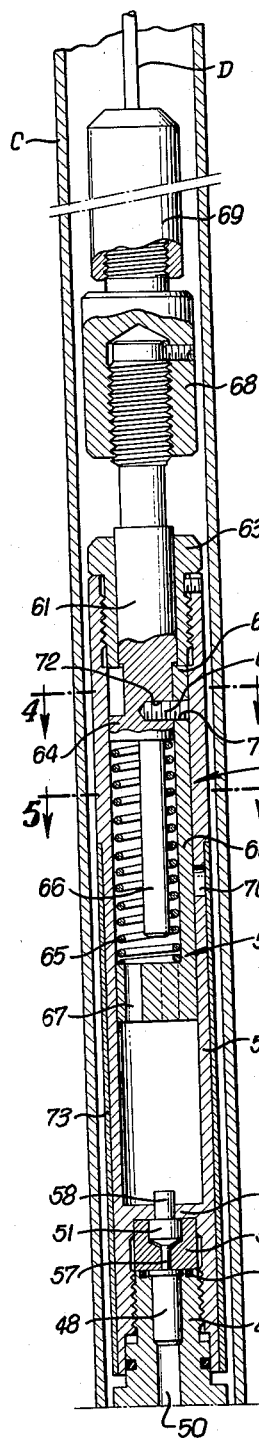
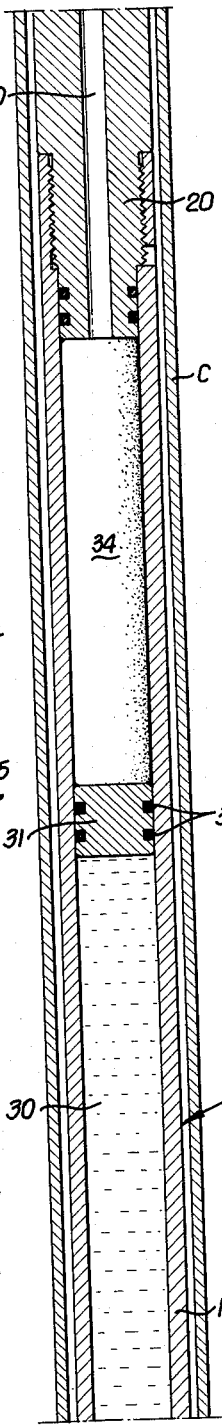
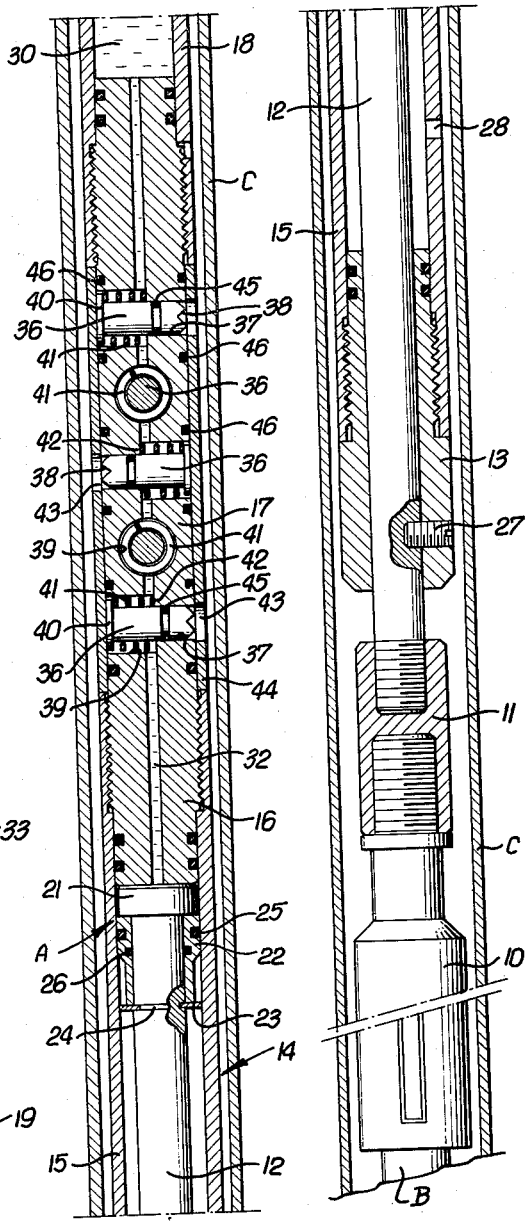
INVENTOR.
WILLIAM D. MYERS
BY
Mellin and Hanscom
ATTORNEYS.

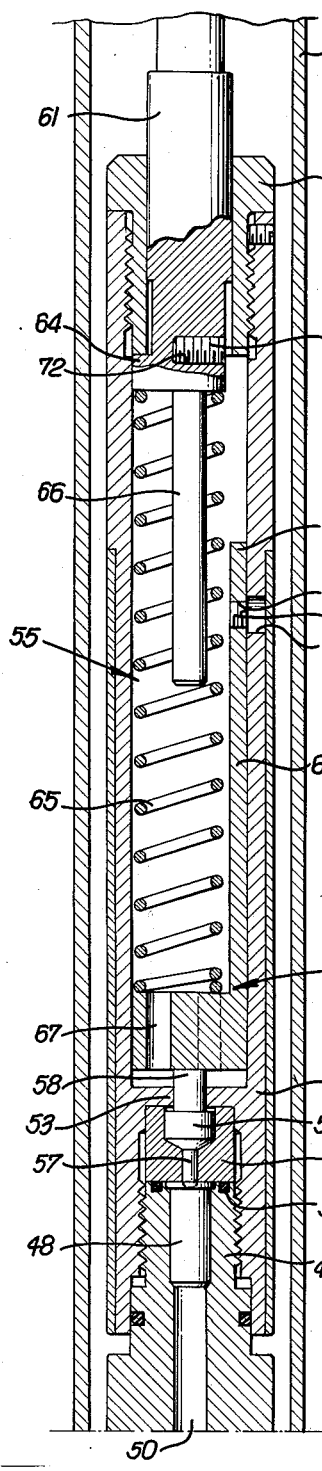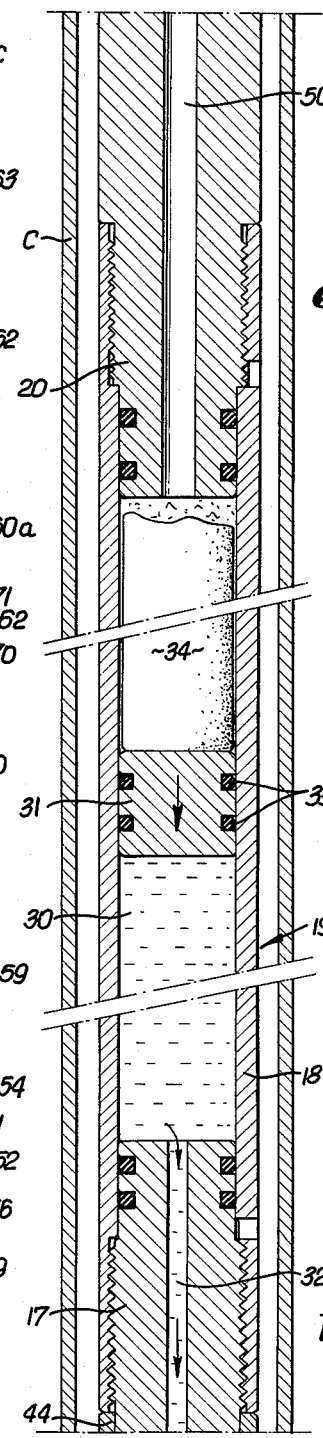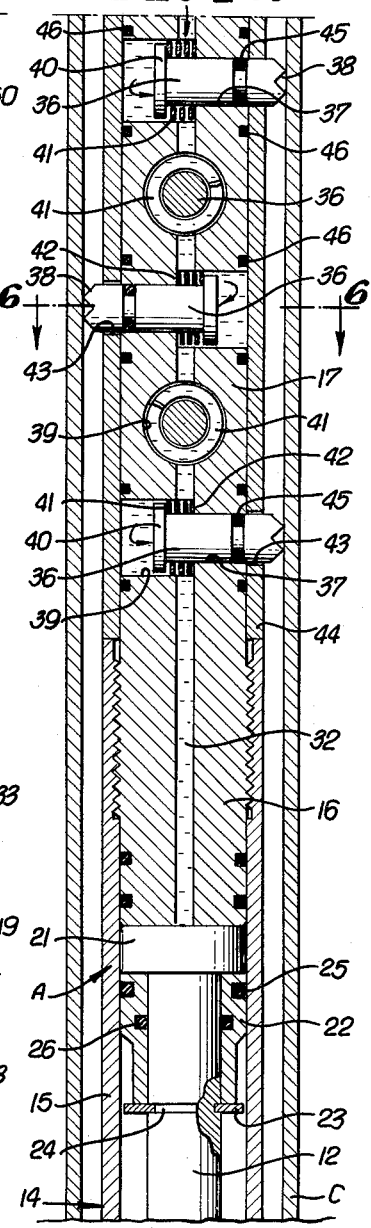

April 5, 1966  W. D. MYERS  3,244,232
PRESSURE ACTUATED PUSHING APPARATUS
Filed April 15, 1963  6 Sheets-Sheet 3
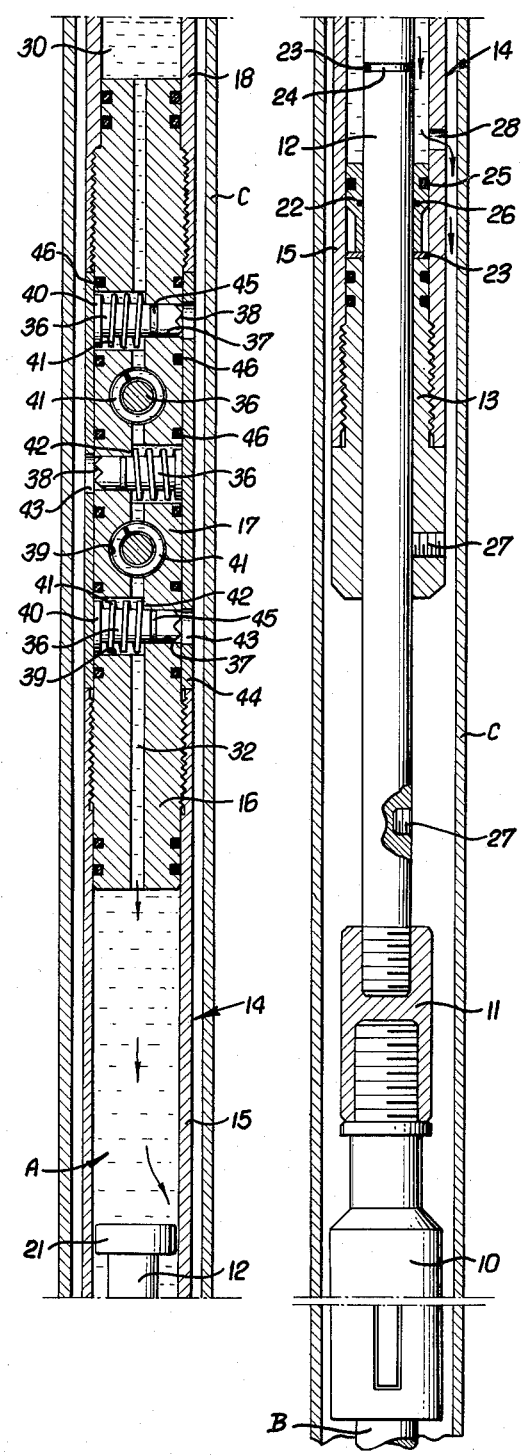
INVENTOR.
WILLIAM D. MYERS
BY
Mellin and Hanscom
ATTORNEYS.

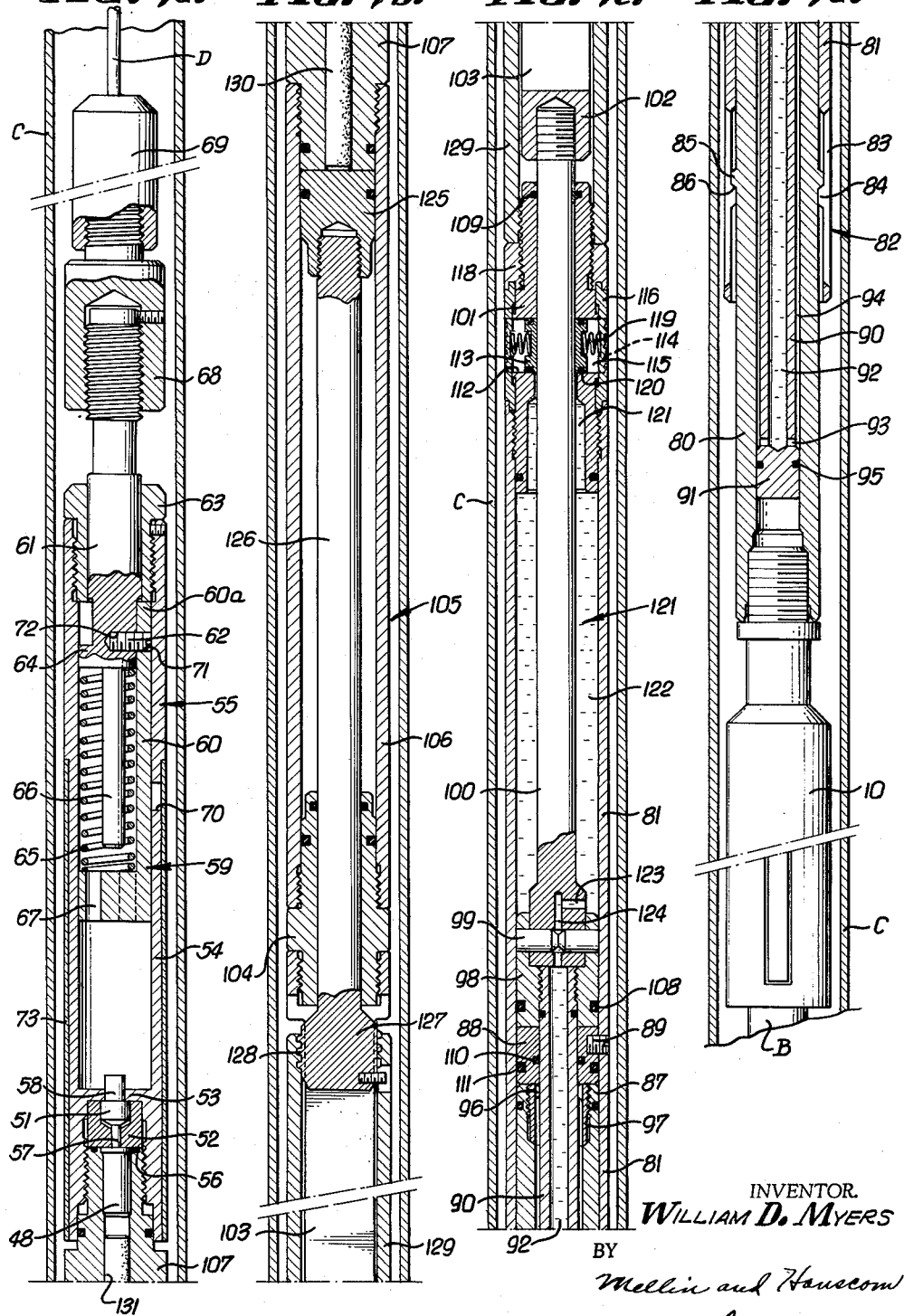

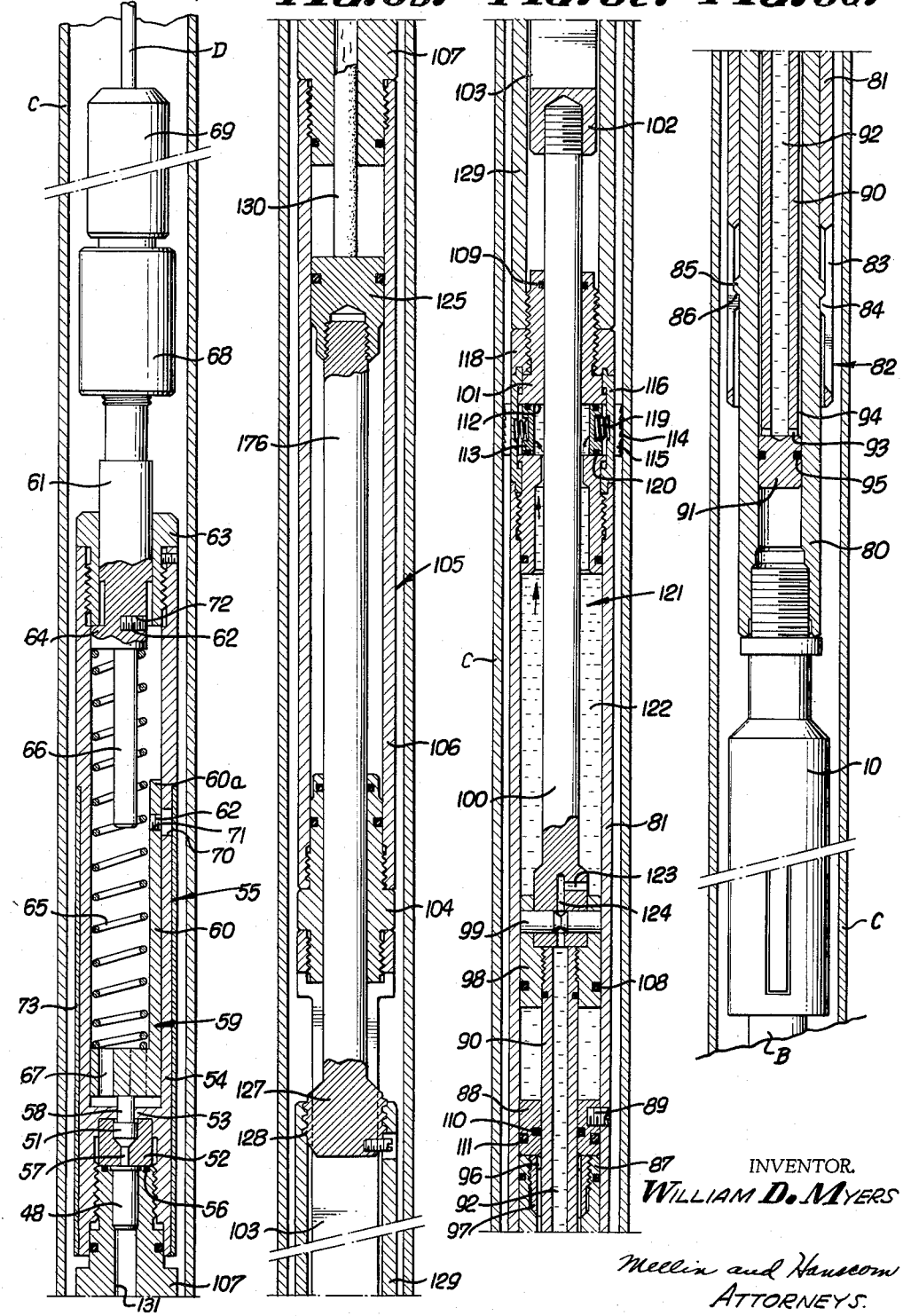

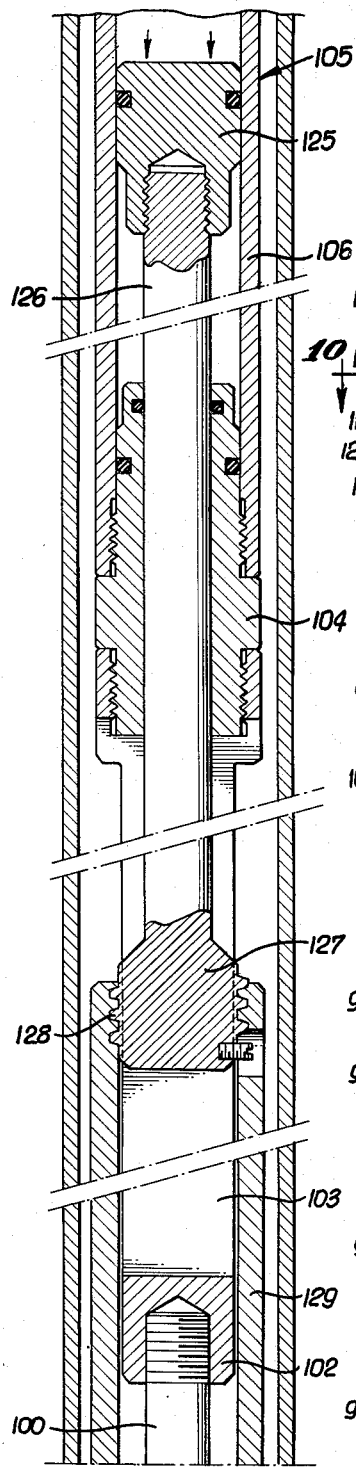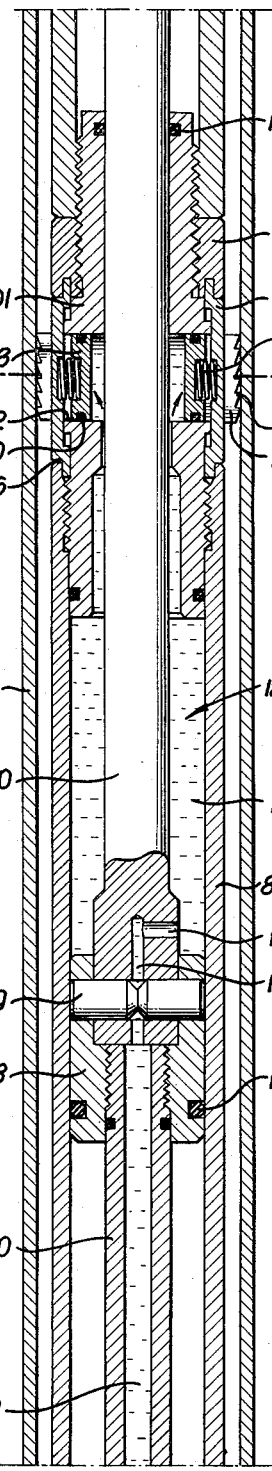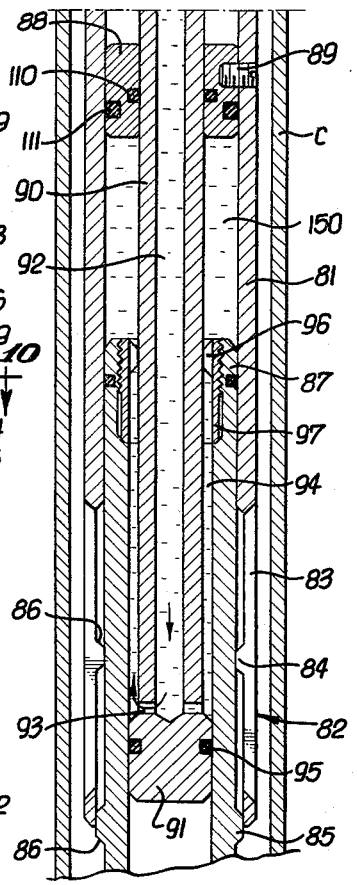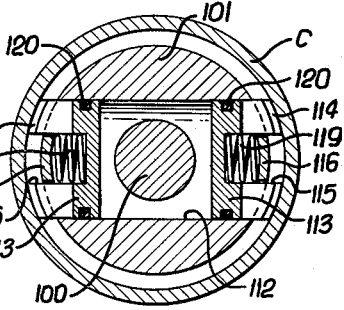

United States Patent Office 3,244,232
Patented Apr. 5, 1966

3,244,232
PRESSURE ACTUATED PUSHING APPARATUS
William D. Myers, Houston, Tex., assignor to Baker Oil Tools, Inc., Los Angeles, Calif., a corporation of California
Filed Apr. 15, 1963, Ser. No. 273,236
17 Claims. (Cl. 166—63)

The present invention relates to subsurface well bore apparatus, and more particularly to apparatus for exerting a longitudinal force on another device in the well bore, for the purpose of moving it to another position in the well bore, or for releasing the device from the well bore.

An object of the invention is to provide improved apparatus adapted to be lowered in a well bore and capable of exerting a substantial force on a device therein without the need for transmitting such force from the top of the well bore.

Another object of the invention is to provide apparatus adapted to be lowered in a well bore on a running-in string, such as a wire line, and capable of exerting a comparatively high pushing force on a device in the well bore without transmitting such force from the top of the well bore through the wire line or other running-in string.

A further object of the invention is to provide apparatus adapted to be lowered in a well bore and capable of transmitting a very high pushing force on a device in the well bore to shift or release the same, the apparatus containing its own source of energy from which the pushing force is derived.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense, since the scope of the invention is best defined by the appended claims.

Referring to the drawings:

FIGURES 1a, 1b, 1c and 1d together constitute a longitudinal section through apparatus disposed in a tubular string in a well bore, with the parts in their initial position for lowering the apparatus through the tubular string, FIGS. 1b, 1c and 1d constituting lower continuations of FIGS. 1a, 1b and 1c, respectively;

FIGS. 2a, 2b and 2c are longitudinal sections on an enlarged scale corresponding to FIGS. 1a, 1b and 1c showing the apparatus anchored in the tubular string, FIGS. 2b and 2c constituting lower continuations of FIGS. 2a and 2b, respectively;

FIGS. 3a and 3b are longitudinal sections corresponding to FIGS. 1c and 1d showing the apparatus anchored in the tubular string, with its lower portion in position after the device has been pushed or released in the tubing string and the actuating force has been relieved, FIG. 3b being a lower continuation of FIG. 3a;

FIG. 4 is an enlarged cross-section taken along the line 4—4 on FIG. 1a;

FIG. 5 is an enlarged cross-section taken along the line 5—5 on FIG. 1a;

FIG. 6 is an enlarged cross-section taken along the line 6—6 on FIG. 2c;

FIGS. 7a, 7b, 7c and 7d are a longitudinal section through another embodiment of apparatus disposed in the tubular string, with the parts in their initial condition for lowering the apparatus in the tubular string, FIGS. 7b, 7c and 7d being lower continuations of FIGS. 7a, 7b and 7c, respectively;

FIGS. 8a, 8b, 8c and 8d are views corresponding to FIGS. 7a, 7b, 7c and 7d illustrating the apparatus anchored in the tubular string prior to its exerting a pushing force on a device in the tubular string, FIGS. 8b, 8c and 8d being lower continuations of FIGS. 8a, 8b and 8c, respectively;

FIGS. 9a, 9b and 9c are views on an enlarged scale corresponding to FIGS. 8b, 8c and 8d illustrating the apparatus anchored in the tubing string and exerting a pushing action on the device in the tubular string, FIGS. 9b and 9c constituting lower continuations of FIGS. 9a and 9b, respectively;

FIG. 10 is an enlarged cross-section taken along the line 10—10 on FIG. 9b.

The form of apparatus A illustrated in FIGS. 1 to 6, inclusive, is adapted to move another device B, such as a sleeve valve, stuck choke, or the like, in a downward direction in a tubular string C, such as a string of production tubing, disposed in a well bore, by the exertion of a pushing action or downward longitudinal force thereon. The apparatus A can be lowered in the tubular string from the top of a hole on a running-in string D, such as a wire line, which can be piano wire, the apparatus being capable of exerting its downward force on the device B in the tubular string C without the need for transmitting any of such force from the top of the hole through the running-in string D. The source of power or energy for exerting the downward force on the device is embodied within the apparatus itself, and can be released under the control of the operator from the top of the well bore.

The lower portion of the apparatus A is constituted by any suitable tool, such as a pushing tool or overshot 10, which is adapted to fit over the device B. This overshot is of any suitable form and preferably one which becomes coupled to the device upon being subjected to an upward movement or force. The upper end of the overshot 10 is threadedly attached to a lower connector or coupling 11, which is, in turn, threadedly connected to the lower end of a piston rod 12 forming a portion of a fluid actuated pushing mechanism. This piston rod is slidable within the lower head 13 of a lower cylinder 14, being threadedly secured to the lower end of a cylinder sleeve 15, the upper end of which is threadedly attached to an upper cylinder head 16 constituting part of an anchor body 17. The upper end of the anchor body 17 is threadedly attached to the lower end of a cylinder sleeve 18 of an upper elongate cylinder 19, the upper end of this latter sleeve being threadedly attached to an upper cylinder head 20.

Initially, the piston rod 12 is disposed in an upper position within the lower cylinder 14 and is integral, or otherwise suitably secured, to an upper piston head 21. Surrounding the piston rod immediately below the piston head is an annular piston sleeve 22, the lower end of which rests upon a shear ring 23 fitting within a peripheral groove 24 in the piston rod 12. This piston sleeve is slidable along the wall of the lower cylinder sleeve 15, leakage therebetween being prevented by a suitable piston ring 25 mounted on the sleeve 22. Leakage between the sleeve and the rod 12 is also prevented by a suitable seal ring 26 mounted on the sleeve and engaging the periphery of the rod.

The piston structure 12, 21, 22 is initially secured in its upward position within the lower cylinder 14 by one or more shear screws 27 connecting the lower cylinder head 13 to the rod 12, as disclosed most clearly in FIG. 1d. The lower cylinder sleeve is also provided with one or a plurality of bleeder ports 28 adjacent to the lower cylinder head 13, in order that downward shifting of the piston sleeve 22 below the ports 28, following shearing of the shear ring 23, allows fluid pressure to bleed from the cylinder 14 on the high pressure side of the piston sleeve 22, as described hereinbelow.

The piston 21, 22 and rod 12 are shiftable downwardly in the lower cylinder as a result of pressure imposed on a liquid 30 above the piston and located in the upper cylinder 19 below an upper piston 31 slidable in this cylinder, the liquid also being disposed in a central passage 32 extending completely through the anchor body 17, this passage 32 permitting communication between the lower end of the upper cylinder 19 and the upper end of the lower cylinder 14. Leakage around the piston 31 is prevented by one or more piston rings 33 thereon slidably and sealingly engaging the cylinder sleeve 18.

The upper floating piston 31 is forced in a downward direction as the result of the burning away of a propellant or power charge 34 contained in the upper cylinder 19 above the piston 31. As this propellant or power charge burns away, it develops a gas at an increasing pressure, which is capable of forcing the floating piston 31 downwardly and imposing a pressure on the liquid 30, forcing the liquid in a downward direction through the central anchor body passage 32 into the lower cylinder 14 for downward action upon the piston structure 21, 22 and its piston rod 12. Reactively, there will be an upward force imposed on the cylinder head 16 and anchor body 17, tending to shift the latter upwardly in the tubing string C, which force, however, is resisted by anchoring the cylinder mechanism 14, 17, 19 to the tubular string. In the specific apparatus illustrated in the drawings, such anchoring occurs hydraulically by utilizing the pressure or force developed by the burning propellant or power charge 34, which pressure is transmitted through the upper floating piston 31 to the liquid 30.

The anchor body 17 has a plurality of longitudinally spaced gripping members or buttons 36 slidably mounted in cylinder bores 37 in the anchor body, which cylinder bores communicate with the central body passage 32. The gripping members 36 are angularly displaced from one another, to engage the inner wall of the tubular string C at different positions arcuately therearound. As shown, each gripping member 36 is in the form of a piston or button having outer teeth 38 adapted to engage and embed themselves in the wall of the tubular string, this button extending from its cylinder inwardly into an enlarged counterbore 39 and terminating in a rearward spring seat 40 against which one end of a helical compression spring 41 bears which encircles the piston member, the other end of this spring engaging the base 42 of the counterbore. Each gripping member 36 is urged in a direction outwardly of the body 17 against the force of its retracting spring 41 by the pressure of fluid in the central passage 32, which can act on the cross-sectional area of each gripping member, the outer tooth portion 38 of each gripping member being adapted to shift through an opening 43 in a housing 44 surrounding the tubular body and into engagement with the wall of the tubular string C. Leakage of fluid between each cylinder 37 and piston 36 is prevented by a suitable seal ring 45 mounted on the piston and engaging the wall of the cylinder; whereas, leakage of fluid between the longitudinally spaced cylinders 37 is prevented by suitable seal rings 46 mounted on the anchor body 17 and sealingly engaging the wall of the anchor housing 44 surrounding the body 17. The openings 43 in the housing are placed in alignment with the cylinders 37, being held in such aligned position by the locking action of the upper cylinder sleeve 18 against its upper end and by the locking action of the lower cylinder sleeve 15 against its lower end.

It is evident that the pressure in the liquid 30 is imposed upon the inner ends of each anchor element 36 and also upon the piston structure 21, 22 and the piston rod 12. The shear screw or screws 27 securing the piston rod 12 to the lower cylinder head 13 have a strength which is much greater than the force of each spring 41, so that assurance is had that the liquid 30 under pressure will first shift the anchor elements 36 outwardly into anchoring engagement with the wall of the tubular string C, for the purpose of firmly securing the cylinders 19, 14 to the tubular string, before the shear screws 27 are disrupted and a downward force exerted through the piston rod 12 on the pushing tool 10 and the device or fish B in the tubular string.

The propellant or power charge 34 contains its own source of oxygen and, when ignited, progressively burns away to generate gas at an increasing pressure within the upper cylinder 19, urging the floating piston 31 downwardly, the downward force being transmitted through the liquid 30 to the anchor elements 36 and to the upper end of the piston structure 21, 22. The propellant may be of a known type. It may be provided in stick form, pellet form, or powder form, one specific type of propellant or power charge being described in United States Patent No. 2,640,547. It is ignited by a blank cartridge 48 mounted within the upper gun barrel portion 49 of the upper cylinder head 20. When the cartridge is fired, the flame issuing in a downward direction from it passes through the central passage 50 in the head 20 and ignites the propellant 34. The blank cartridge is fired by a firing pin 51 slidably mounted in a breechblock or cap 52 disposed across the upper end of the gun barrel 49, being clamped thereagainst by an inwardly directed flange 53 of a housing 54 of a firing device 55. Fluid leakage into the gun barrel is prevented by a suitable gasket seal 56 between the breechblock 52 and the upper end of the barrel 49.

The firing pin 51 has a lower projection 57 extending through the breechblock 52, which is adapted to engage the upper end of the cartridge 48. It also has an upwardly extending stem 58 projecting through the flange 53 into the housing 54. This stem is adapted to be struck by a striker 59 mounted within the housing and disposed initially a substantial distance above the firing pin stem. The striker is slidable in the housing 54 and has an upwardly extending arm 60 at one side secured to a mandrel 61 by a shear screw 62. Movement of the striker 59 and mandrel 61 in an upward direction within the housing 54 is limited by engagement of the upper end 60a of the arm with a head 63 extending into the housing and threadedly secured thereto. The mandrel 61 also has a stop flange 64 disposed within the housing and adapted to engage the lower end of the head 63, after the shear screw 62 has been disrupted. This stop flange also functions as an upper seat for a helical compression spring 65 disposed within the housing 54 and along the striker arm 60, the lower end of the spring engaging the striker 59. This spring is retained in appropriate operative position when in its compressed condition by an aligning pin 66 integral with and depending from the mandrel 61. The striker also has a plurality of longitudinal by-pass ports 67 therein to prevent air, or other fluids, in the housing 54 from retarding downward movement of the striker when the compression spring 65 is released as a result of shearing of the screw 62, as described hereinbelow.

The mandrel 61 is movable downwardly within the housing 54 to an extent limited by engagement of the lower end of an upper sub 68, threaded on the upper end of the mandrel, with the upper end of the head 63. The upper end of this sub is threadedly attached to sinker bars or a set of jars 69, which are, in turn, suitably secured to the wire line D extending to the top of the well bore.

To facilitate compressing the spring 65 and attaching the striker arm 60 to the mandrel 61, the housing has a suitable lateral access hole 70 therethrough, which is, at first, open to the exterior of the housing. Prior to assembly of the housing 54 to the upper cylnider head 20, the striker 59 is disposed in the housing and the spring 65 also placed therein. The mandrel 61 is then lowered into the housing, the striker 59 resting upon the flange 53, at which time the hole 71 of the striker arm is aligned with the access hole 70. The mandrel 61 is then shifted downwardly in the housing to compress the spring 65, until its threaded hole 72 for the shear screw 62 is aligned with the arm hole 71, whereupon the shear screw 62 can be inserted through the access hole 70 and threaded into the arm hole 71 and the mandrel hole 72, securing the striker mechanism 59 to the mandrel 61 with the spring 65 in a highly compressed condition. The head 63 can then be slipped over the mandrel 61 and threaded into the housing 54. A cover sleeve 73 is slipped over the housing 54 to cover the opening 70, the housing then being assembled on the upper cylinder head 20 with the firing pin 51, breechblock 52, blank cartridge 48, and propellant 34 in their proper positions. The attachment of the upper sub 68 to the mandrel 61 will prevent the latter from moving downwardly sufficiently for the striker 59 to engage the firing pin stem 58.

When it is desired to exert a downward force on the device or fish B in the tubular string C, such as production tubing, the apparatus A is assembled with its parts in the position illustrated in FIGS. 1a to 1d, the liquid 30 filling the spaces between the lower piston 21 and the floating piston 31, the lower piston head 21 and the floating piston 31 being in their uppermost positions. The apparatus is lowered in the tubular string on the wire line D until the pushing tool or overshot 10 engages the device B in the tubular string, the pushing tool latching onto this device. If difficulty in latching occurs, a downward jarring action can be imparted on the apparatus A, since the upper sub 68 can engage the head 63, the downward force being transmitted through the housing 54, upper cylinder 19, and anchor body 17 to the lower piston head 21, and through the piston rod 12 and coupling 11 to the overshot 10, such downward jarring being incapable of effecting firing of the mechanism or relative shifting of any parts.

With the overshot 10 engaging and coupled to the device B, an upper jarring action can take place, the wire line D, sinker bars or jars 69, and upper sub 68 moving upwardly to move the mandrel 61 and the striker device 59 upwardly, the striker arm 60 engaging the housing head 63. In view of such engagement, the upper jarring action will shear the screw 62 securing the arm 60 to the mandrel 61 and release the spring 65, the mandrel flange 64 moving upwardly a short distance into engagement with the upper housing head 63 and the striker 59 being propelled by the spring 65 downwardly into contact with the firing pin stem 58 with sufficient force to fire the blank cartridge 48, the flame emanating therefrom igniting the power charge 34, which begins to burn away.

The pressure generated by the burning of the power charge 34 acts downwardly on the upper floating piston 31, exerting a downward force on the liquid 30 therebelow. When the pressure becomes sufficient, the liquid 30 will shift the radially arranged anchor devices 36 outwardly against the force of their springs 41 into anchoring engagement with the wall of the tubular string C. The pressure developed in the liquid 30 must reach a substantial value before it can exert sufficient downward force on the lower piston structure 21, 22 and piston rod 12 to shear the screw 27 securing the piston rod to the cylinder 14. Accordingly, assurance is had that the gripping members 36 are held by the liquid pressure outwardly against the wall of the tubular string C with very high holding force to prevent longitudinal movement of the anchor body 17 and of the upper and lower cylinders 19, 14 connected thereto. The parts are now in the relative positions illustrated in FIGS. 2a, 2b and 2c, at which time it is to be noted that the lower piston 21, 22 has not moved downwardly in the lower cylinder 14, the shear screw or screws still being intact.

As the propellant or power charge 34 continues to burn away, the gas pressure in the upper cylinder 1 continues to increase, exerting an increasing downward force on the floating piston 31 and increasing the pressure on the liquid 30. The pressure becomes sufficiently high as to overcome the shear strength of the screw or screws 27 securing the piston rod 12 to the lower cylinder head 13, the disruption of such screws then causing the lower piston device 21, 22 and piston rod 12 to move downwardly in the cylinder 14 and exert a downward force through the lower connector 11 and pushing tool 10 on the device B, which is very great, effecting downward movement of the device in the tubular string C, or if the device B is stuck in the tubular string and it is desired to release it therefrom, releasing the device from the tubular string. The device B may release and will then allow the piston 21, 22 and piston rod 12 to move downwardly in the lower cylinder 14 to its fullest extent, as determined by engagement of the lower shear ring 23 with the lower cylinder head 13. Assuming the parts to be in this position, the bleeder ports 28 would be located above the seal ring 25 on the piston sleeve 22 and the fluid pressure in the lower cylinder would be allowed to bleed out into the tubular string C, thereby relieving the liquid pressure in the lower cylinder 14, as well as in the central passage 32 through the anchor body 17 and in the radial anchor body cylinders 37, the springs 41 then shifting the gripping members 36 inwardly to their retracted position. The apparatus A is now released from the tubular string C and can be withdrawn from the latter by moving the running-in string D upwardly, this upward movement being transmitted through the sinker bar 69, sub 68 and mandrel 61 to the housing 54, and from the latter through the upper cylinder 19 and anchor body 17 to the lower cylinder 14, the head 13 of which engages the piston structure 21, 22 and elevates the piston rod 12, connector 11, and pushing tool 10 in the tubular string, as well as the device B therewith.

In the event that the device or fish B can only move downwardly a limited relatively short distance in the production tubing C, as a result of the pushing action, the piston rod 12 will come to rest, but the pressure developed by the propellant or power charge 34 in the upper cylinder will continue to increase, such increased pressure being transmitted through the upper piston 31 to the liquid 30 and being exerted with a greater force on the piston sleeve 22 and the shear ring 23. When the pressure exceeds the strength of the shear ring, the outer part of the latter is disrupted from its inner portion within the groove 24, the liquid pressure then shifting the piston sleeve 22 downwardly in the lower cylinder 14 and along the stationary piston rod 12 until the sleeve 22 is disposed below the bleeder ports 28, as shown in FIGS. 3a and 3b. This position will allow the liquid pressure to be relieved in the lower cylinder 14, as well as the anchor body passage 32 and the radial cylinders 37, the springs 41 shifting the gripping members 36 back to their initial retracted position.

The apparatus A can now be removed from the tubular string C by upward movement of the running-in string D, which is transmitted to the cylinder devices 19, 14, as described above, the lower cylinder head 13 carrying the piston sleeve 22 upwardly until the latter engages the lower piston head 21, whereupon, the piston rod 12 is moved upwardly with the remainder of the apparatus to carry the coupling 11, overshot 10, and device or fish B upwardly with it.

With the apparatus illustrated in FIGS. 1 to 6, it is unnecessary to impose any substantial force on the running-in string or wire line D to effect a downward shifting of the device B disposed within the tubular string C. Essentially, the only force to which the wire line is subjected is that of the weight of the apparatus A and the jarring force required to release the firing device 55. The propellant or power charge 34 is capable of generating very high pressures, which are transmitted through the upper floating piston 31 to the liquid 30, and such pressures will firmly hold the anchor elements 36 against the tubular string to prevent longitudinal movement of the cylinders 19, 14 in the latter, so that a very substantial force can be imposed in a downward direction on the piston rod 12 and through the pushing tool 10 on the device B, which is to be pushed or shifted downwardly in the tubular string. Release of the apparatus A from the tubular string C is automatic, as a result of either the full release of the device B from the tubular string, so that the piston device 21, 22 moves downwardly within the lower cylinder 14 to its maximum extent below the bleeder ports 28, or as a result of the pressure above a predetermined degree shearing the ring 23 and moving the piston sleeve 22 downwardly below the bleeder port, thereby relieving the liquid pressure in the apparatus.

Another embodiment of the invention is illustrated in FIGS. 7 to 10, inclusive. The firing device 55 for discharging the blank cartridge 48 is the same as in the other form of the invention. However, a different specific gaseous and liquid pressure apparatus is employed for imposing a downward force on the device or fish B to be released and moved within the tubular string C.

The pushing tool and overshot 10 is connectible to the device or fish B in the tubular string in the same manner as in the other form of apparatus, its upper end being threadedly attached to the lower end of an elongate piston sleeve 80 which extends upwardly within an elongate lower cylinder 81, the lower portion of which is releasably secured to the annular piston sleeve by a latch device 82. As shown, the lower portion of the cylinder sleeve 81 includes circumferentially spaced latch legs 83 integral with inwardly extending latch fingers 84 adapted to be disposed under a cam 85 on the annular piston sleeve. The coengaging surfaces 86 on the cam and fingers are tapered in a downward and inward direction, such that a downward force on the piston sleeve 80 of a sufficient value will shift the cam fingers 84 outwardly to permit downward movement of the sleeve 80 within the cylinder 81, as described hereinbelow.

When the piston sleeve 80 is in its upper position, with its cam 85 above the fingers 84 (FIG. 7d), the upper head end 87 of the piston sleeve is disposed below and adjacent to a cylinder head 88, which is secured to the cylinder sleeve 81 by a plurality of screws 89. Slidably mounted in the annular piston sleeve 80 is a tubular tension rod 90 having a lower head 91 slidable along the wall of the piston sleeve, the central passage 92 through the rod communicating at its lower end through side ports 93 with an annular passage 94 between the rod 90 and piston sleeve above the head 91, this annular passage extending upwardly to the cylinder head 88. The tubular tension rod head 91 has a suitable side seal ring 95 thereon slidably and sealingly engaging the wall of the annular piston 80. The head 91 is also adapted to engage inward projections 96 of a ring 97 threadedly secured in the upper head end of the piston sleeve 80 when the rod 90 moves upwardly sufficiently in the piston 80.

The tubular rod 90 extends upwardly through the cylinder head 88 and is threadedly attached to an annular pump piston 98 slidable in the cylinder sleeve 81 above the cylinder head 88. This piston is connected through a transverse, releasable or shearable stud 99 with the lower end of a tension rod 100 extending upwardly through an anchor body 101. The upper end of the rod is threadedly attached to the lower end of a tension mandrel 102 having an elongate transverse slot 103 therethrough, the upper end of this mandrel being threadedly attached to the lower head 104 of an upper cylinder 105. The head is threadedly secured to the cylinder sleeve 106 of such cylinder, the cylinder sleeve, in turn, being threadedly attached to the upper head 107 of the upper cylinder, which can be essentially the same head as the cylinder head 20 in the other form of apparatus. Leakage of fluid between the pump piston 98 and cylinder 81 is prevented by a suitable side seal 108 on the piston engaging the wall of the cylinder, and leakage of fluid between the tension rod 100 and anchor body 101 is prevented by a suitable rod seal 109 on the body engaging the periphery of the rod. Fluid leakage between the cylinder head 88 and rod 90 is prevented by the side seal 110, and leakage between the head 88 and cylinder 81 by the side seal 111.

The anchor body 101 has a plurality of radial cylinders 112 therein, each of which contains an anchor or gripping element 113, such as a piston, slidable radially therein, the piston having wickers or teeth 114 adapted to engage the wall of the tubular string C. Each gripping member has a longitudinal slot 115 across which extends an aligning bar 116 suitably attached to the anchor body, as by the upper end 117 of the cylinder or housing 81 engaging the lower portion of the bars, and a nut 118 threaded on the upper portion of the anchor body 101 and overlapping the upper end of the bars 116. A compression spring 119 is disposed between each bar 116 and an inner portion of the gripping member 113 to urge the latter inwardly to a retracted position. Leakage of fluid between each piston gripping member 113 and its cylinder wall is prevented by a suitable seal ring 120 on the piston slidably and sealingly engaging the cylinder wall.

The inner end of each cylinder 112 communicates with an annular liquid chamber 121 between the tension rod 100 and the housing or cylinder 81, this chamber also being present between the anchor body 101 and the rod 100. The liquid chamber extends from the piston 98 to the seal ring 109. This chamber is filled with liquid 122, the liquid also being contained in a port 123 communicating with a passage 124 in the lower end of the tension rod 100, which opens into the central passage 92 through the tubular tension rod 90, which, in turn, communicates through its ports 93 with the annular space 94 between the tubular tension rod and the annular piston sleeve 80. Such spaces are all filled with the liquid 122, pressure being imposed on the liquid by shifting the piston 98 upwardly toward the anchor body 101 as a result of upward movement of the tension rod 100. Such liquid under pressure can act on the inner ends of the gripping members 113 to shift them outwardly against the force of their compression springs 119 and will also act on the upper end 87 of the annular piston sleeve 80 below the cylinder head 88 to urge the piston sleeve in a downward direction.

The upper cylinder 105 contains a piston 125 threadedly secured to the upper end of a piston rod 126 extending through the lower cylinder head 104. Below the head 104, the piston rod 126 is integral with a crossover link or head 127 slidable in the elongate mandrel slot 103, this crossover link having its outer portion 128 threaded for attachment to the upper end of a thrust sleeve 129 extending around the mandrel 102, with its lower end threadedly attached to the anchor body 101. A propellant or power charge 130 containing its own source of oxygen, as in the other form of the invention, is disposed in a propellant chamber 131 in the upper cylinder head, this propellant, when ignited, progressively burning away to generate gas at an increasing pressure within the cylinder 105, urging the upper piston 125 and rod 126 downwardly and tending to shift the cylinder 105 relatively in an upward direction. The downward movement of the piston rod 126 is transmitted through the crossover head 127 to the thrust sleeve 129 and to the anchor body 101. The upward movement or force of the cylinder 105 is transmitted from its lower cylinder head 104 to the tension mandrel 102, and from the latter through the tension rod 100 and release stud or pin 99 to the piston 98 and the tubular tension rod 90.

When the cylinder 105 moves upwardly, it moves the piston 98 upwardly in the housing or lower cylinder 81 toward the anchor body 101, imposing a pressure on the liquid 122 in the chamber 121, as well as in the other passages 123, 124, the pressure being transmitted through the liquid in the tubular tension rod passage 92 and the annular space 94 between the tubular tension rod and annular piston sleeve to urge the annular piston sleeve 80 in a downward direction. The pressure of the liquid 122 is also acting upwardly on the anchor body 101 and also outwardly on the gripping members 113. It is also acting upwardly on the cylinder head 88. However, the outward expansion of the anchor buttons 113 into engagement with the tubular string C precludes upward movement of the lower cylinder or housing 81, as well as of the thrust sleeve 129 and the upper rod 126 and piston 125. Accordingly, the upward movement of the cylinders 105 is transmitted through the tension mandrel 102 and tension rod 100 to the piston 98 and the tubular tension rod 90, to generate pressure in the liquid 122 in the chamber 121 for downward action on the annular piston sleeve 80 and on the pushing tool 10 connected thereto, as well as the device B in the tubular string C engaged by the latter.

In the operation of the apparatus illustrated in FIGS. 7 to 10, the parts are initially disposed in the condition illustrated in FIGS. 7a to 7d, the gripping members 113 being in retracted position. The apparatus is lowered on the running-in string or wire line D in the tubular string C until the pushing tool and overshot 10 moves over the device B. Upward movement of the wire line D will now be transmitted through the apparatus and will latch the pushing tool 10 to the device B. An upward jarring action is now taken on the wire line D, which will disrupt the screw 62 securing the arm 60 to the mandrel 61 and cause the spring 65 to propel the striker 59 downwardly against the firing pin 51 to discharge the cartridge 48. The flame emanating therefrom ignites the power charge or propellant 130, which will begin to burn away progressively and generate gas at an increasing pressure. Such gas under pressure will act upon the upper end of the piston 125 and will tend to shift it downwardly in its cylinder 105. However, such downward movement cannot occur to any significant extent since the downward thrust is transmitted through the thrust sleeve 129 to the anchor body 101, and from the latter through the cylinder 81 to the cylinder head 88, which engages the annular piston sleeve 80 connected to the overshot 10, which rests upon the device B to be freed in the tubular string C.

Accordingly, the cylinder 105 will move upwardly along the piston 125 and piston rod 126, pulling the tension mandrel 102 and tension rod 100 upwardly with it to shift the pump piston 98 upwardly toward the anchor body 101 and developing pressure in the liquid 122 in the chamber 121. Such liquid under pressure will act in an outward direction on the gripping members 113 to urge them outwardly of the anchor body 101 and shift their teeth 114 into anchoring engagement with the wall of the tubing C. The pressure of the liquid is also acting on the upper end 87 of the annular piston sleeve 80, but such piston sleeve cannot move downwardly of the cylinder 81 at this time since its cam 85 is constrained by the latch fingers 84. However, when the pressure of the gas generated by the burning away of the power charge 130 increases sufficiently, it increases the pressure of the piston 98 on the liquid 122 in the chamber sufficiently to insure that the gripping members 113 are firmly anchored against the wall of the tubing string C, to preclude longitudinal movement of the cylinder 81 therein, and particularly in an upward direction. The increased pressure imposed by the pump piston 98 on the liquid 122 can now exert a sufficient downward force on the upper end 87 of the annular pushing sleeve 80 to overcome the force holding the latch fingers 84 under the cam 85, the cam shifting the latch fingers outwardly from engagement therewith, freeing the annular piston sleeve for movement in a downward direction, its force then being imposed through the pushing tool 10 on the device B in the tubular string C.

As the liquid pressure continues to increase, the piston 98 moves upwardly to a greater extent toward the anchor body 101. The liquid 122 is forced from the liquid chamber 121 through the passages 123, 124, 92, 94 into the cylinder space 150 between the cylinder head 88 and the upper end 87 of the annular piston sleeve 80, shifting the latter downwardly, its downward force and movement being exerted on the pushing tool 10 and on the device B in the tubular string until the latter is released or shifted downwardly to the desired position.

During such downward movement of the annular piston sleeve, the liquid 122 under pressure is constantly holding the gripping members 113 outwardly into anchoring engagement with the wall of the tubular string C. If the device B releases completely, the piston 98 can move upwardly toward the anchor body 101 so as to force sufficient liquid 122 from the chamber 121 and into the cylinder space 150 above the piston 80 to shift the latter downwardly to the extent determined by engagement of its inward projections 96 with the lower head 91 of the tubular tension rod 90. If, however, the device B is pushed down to a limited extent, then the upward force on the tension rod 100, as a result of the gas pressure generated in the upper cylinder 105, will continue to increase until the shear strength of the release stud 99 has been exceeded, at which time, the stud will pull apart, freeing the piston 98 therefrom, and relieving the pressure on the liquid 122, the tension rod 100 then moving upwardly to its fullest extent, as determined by engagement of the lower cylinder head 104 with the piston head 125. With the release of the pressure in the liquid chamber 121, the springs 119 shift the anchor elements 113 back to their retracted position within the confines of the anchor body 101, allowing the apparatus to be removed from the tubular string C by elevating the wire line D. Such elevating movement will elevate the cylinder 105, tension mandrel 102, and tension rod 100 connected thereto, the lower end of the tension rod engaging the anchor body 101 and elevating the latter, as well as the cylinder 81 therebelow. The cylinder head 88 engages the pump piston 98 to carry the latter upwardly, and since this piston is secured to the tension rod 90, this member is also shifted upwardly, the tension rod head 91 engaging the inward projections 96 on the annular piston sleeve 80 to move the latter upwardly, together with the pushing tool 10 connected thereto and the device B, if the device is coupled to the pushing tool. The apparatus can now be removed from the tubular string C.

I claim:

1. In apparatus adapted to be lowered in a well bore toward an object previously disposed therein: first and second members movable relative to each other; means connected to said first member and adapted to engage the object to shift the same; fluid operated radially movable gripping means on said second member engageable with the wall of the well bore to anchor said second member in the well bore against movement therein; means providing a fluid under pressure acting between said members to shift said first member relative to said anchored second member and exert a force on said first member and the object tending to shift the object in the well bore; and releasable means interconnecting said members to initially prevent their movement relative to each other and releasable after said gripping means has anchored said second member in the well bore.

2. In apparatus adapted to be lowered in a well bore toward an object previously disposed therein: first and second members movable relative to each other; means connected to said first member and adapted to engage the object to shift the same; fluid operated radially movable gripping means on said second member engageable with the wall of the well bore to anchor said second member in the well bore against movement therein; means providing a fluid under pressure acting on said gripping means to shift said gripping means radially outwardly and also acting between said members to shift said first member relative to said anchored second member and exert a force on said first member and the object tending to shift the object in the well bore; and releasable means interconnecting said member to initially prevent their movement relative to each other and releasable after said gripping means has anchored said second member in the well bore.

3. In apparatus adapted to be lowered in a well bore toward an object previously disposed therein: a cylinder device; a piston device movable in said cylinder device; fluid actuated gripping means on one of said devices for anchoring said one device in the well bore against movement therein; means connected to the other of said devices and adapted to engage the object to shift the same; a fluid in said cylinder device; means for applying pressure to said fluid whereby said fluid shifts said gripping means against the well bore and also shifts said other device to shift the object; and releasable means interconnecting said cylinder device and piston device to initially prevent movement of said piston device relatively in said cylinder device and releasable after said gripping means has anchored said one of said devices in the well bore.

4. In apparatus adapted to be lowered in a well bore toward an object previously disposed therein: a cylinder device; a piston device movable in said cylinder device; fluid actuated gripping means on one of said devices for anchoring said one device in the well bore against movement therein; means connected to the other of said devices and adapted to engage the object to shift the same; a fluid in said cylinder device; means for applying pressure to said fluid whereby said fluid shifts said gripping means against the well bore and also shifts said other device to shift the object; and means releasable by said fluid under pressure for securing said piston device to said cylinder device, said releasable means releasing after said fluid shifts said gripping means against the well bore.

5. In apparatus adapted to be lowered in a well bore toward an object previously disposed therein: a cylinder device; a piston device movable in said cylinder device; fluid actuated gripping means on said cylinder device for anchoring said cylinder device in the well bore against movement therein; means connected to said piston device and adapted to engage the object to shift the same; a fluid in said cylinder device; means for applying pressure to said fluid whereby said fluid shifts said gripping means against the well bore and also shifts said piston device to shift the object; and releasable means interconnecting said cylinder device and piston device to initially prevent movement of said piston device in said cylinder device and releasable after said gripping means has anchored said cylinder device in the well bore.

6. In apparatus adapted to be lowered in a well bore toward an object previously disposed therein: a cylinder device; a piston device movable in said cylinder device; fluid actuated gripping means on said cylinder device for anchoring said cylinder device in the well bore against movement therein; means connected to said piston device and adapted to engage the object to shift the same; a fluid in said cylinder device; means for applying pressure to said fluid whereby said fluid shifts said gripping means against the well bore and also shifts said piston device to shift the object; and means releasable by said fluid under pressure for securing said piston device to said cylinder device, said releasable means releasing after said fluid shifts said gripping means against the well bore.

7. In apparatus adapted to be lowered in a well bore toward an object previously disposed therein: a cylinder device; a piston device movable in said cylinder device; fluid actuated gripping means on one of said devices for anchoring said one device in the well bore against movement therein; means connected to the other of said devices and adapted to engage the object to shift the same; a liquid in said cylinder device; cylinder means; piston means movable in said cylinder means and engaging said liquid; means providing a fluid under pressure in said cylinder means for action on said piston means to apply pressure to said liquid whereby said liquid shifts said gripping means against the well bore and also shifts said other device to shift the object; and releasable means interconnecting said cylinder device and piston device to initially prevent movement of said piston device relatively in said cylinder device and releasable after said gripping means has anchored said one of said devices in the well bore.

8. In apparatus adapted to be lowered in a well bore toward an object previously disposed therein: a cylinder device; a piston device movable in said cylinder device; fluid actuated gripping means on said cylinder device for anchoring said cylinder device in the well bore against movement therein; means connected to said piston device and adapted to engage the object to shift the same; a liquid in said cylinder device; cylinder means; piston means movable in said cylinder means and engaging said liquid; means providing a fluid under pressure in said cylinder means for action on said piston means to apply pressure to said liquid whereby said liquid shifts said gripping means against the well bore and also shifts said piston device to shift the object; and releasable means interconnecting said cylinder device and piston device to initially prevent movement of said piston device in said cylinder device and releasable after said gripping means has anchored said cylinder device in the well bore.

9. In apparatus adapted to be lowered in a well bore toward an object previously disposed therein: a cylinder device; a piston device movable in said cylinder device; fluid actuated gripping means on one of said devices for anchoring said one device in the well bore against movement therein; means connected to the other of said devices and adapted to engage the object to shift the same; a liquid in said cylinder device; cylinder means; piston means movable in said cylinder means and engaging said liquid; means for generating a gas under pressure in said cylinder means for action on said piston means to apply pressure to said liquid whereby said liquid shifts said gripping means against the well bore and also shifts said other device to shift the object; and releasable means interconnecting said cylinder device and piston device to initially prevent movement of said piston device relatively in said cylinder device and releasable after said gripping means has anchored said one of said of said devices in the well bore.

10. In apparatus adapted to be lowered in a well bore toward an object previously disposed therein: a cylinder device; a piston device movable in said cylinder device; fluid actuated gripping means on said cylinder device for anchoring said cylinder device in the well bore against movement therein; means connected to said piston device and adapted to engage the object to shift the same; a liquid in said cylinder device; cylinder means; piston means movable in said cylinder means and engaging said liquid; means for generating a gas under pressure in said cylinder means for action on said piston means to apply pressure to said liquid whereby said liquid shifts said gripping means against the well bore and also shifts said piston device to shift the object; and releasable means interconnecting said cylinder device and piston device to initially prevent movement of said piston device in said cylinder device and releasable after said gripping means has anchored said cylinder device in the well bore.

11. In apparatus adapted to be lowered in a well bore toward an object previously disposed therein: a cylinder device; a piston device movable in said cylinder device; fluid actuated gripping means on one of said devices for anchoring said one device in the well bore against movement therein; means connected to the other of said devices and adapted to engage the object to shift the same; a fluid in said cylinder device; means for applying pressure to said fluid whereby said fluid shifts said gripping means against the well bore and also shifts said other device to shift the object; releasable means interconnecting said cylinder device and piston device to initially prevent movement of said piston device relatively in said cylinder device and releasable after said gripping means has anchored said one of said devices in the well bore; and means for relieving the pressure of said fluid to release said gripping means from the well bore.

12. In apparatus adapted to be lowered in a well bore toward an object previously disposed therein: a cylinder device; a piston device movable in said cylinder device; fluid actuated gripping means on said cylinder device for anchoring said cylinder device in the well bore against movement therein; means connected to said piston device and adapted to engage the object to shift the same; cylinder means connected to one of said devices; piston means movable in said cylinder means; a liquid in said cylinder device and cylinder means engaging said piston device and gripping means and also engaged by said piston means; means providing a fluid under pressure in said cylinder means for moving said cylinder means and piston means relative to each other to apply pressure to said liquid whereby said liquid shifts said gripping means against the well bore and also shifts said piston device in said cylinder device to shift the object; and releasable means interconnecting said cylinder device and piston device to initially prevent movement of said piston device in said cylinder device and releasable after said gripping means has anchored said cylinder device in the well bore.

13. In apparatus adapted to be lowered in a well bore toward an object previously disposed therein: a cylinder device; a piston device movable in said cylinder device; fluid actuated gripping means on said cylinder device for anchoring said cylinder device in the well bore against movement therein; means connected to said piston device and adapted to engage the object to shift the same; cylinder means connected to said cylinder device; piston means movable in said cylinder means; a liquid in said cylinder device and cylinder means engaging said piston device and gripping means and also engaged by said piston means; means providing a fluid under pressure in said cylinder means for moving said piston means in said cylinder means to apply pressure to said liquid whereby said liquid shifts said gripping means against the well bore and also shifts said piston device in said cylinder device to shift the object; and releasable means interconnecting said cylinder device and piston device to initially prevent movement of said piston device in said cylinder device and releasable after said gripping means has anchored said cylinder device in the well bore.

14. In apparatus adapted to be lowered in a well bore toward an object previously disposed therein: a cylinder device; a piston device movable in said cylinder device; fluid actuated gripping means for anchoring said cylinder device in the well bore against movement therein; means connected to said piston device and adapted to engage the object to shift the same; cylinder means connected to said cylinder device; piston means movable in said cylinder means; a liquid in said cylinder device and cylinder means engaging said piston device and gripping means and also engaged by said piston means; means for moving said piston means in said cylinder means to apply pressure to said liquid whereby said liquid shifts said gripping means against the well bore and also shifts said piston device in said cylinder device to shift the object; and releasable means interconnecting said cylinder device and piston device to initially prevent movement of said piston device in said cylinder device and releasable after said gripping means has anchored said cylinder device in the well bore.

15. In apparatus adapted to be lowered in a well bore toward an object previously disposed therein: a cylinder device; a piston device movable in said cylinder device; fluid actuated gripping means for anchoring said cylinder device in the well bore against movement therein; means connected to said piston device and adapted to engage the object to shift the same; cylinder means connected to said cylinder device; piston means movable in said cylinder means; a liquid in said cylinder device and cylinder means engaging said piston device and gripping means and also engaged by said piston means; means for moving said piston means in said cylinder means to apply pressure to said liquid whereby said liquid shifts said gripping means against the well bore and also shifts said piston device in said cylinder device to shift the object, said moving means comprising means for generating gas under pressure for action upon said piston means.

16. In apparatus adapted to be lowered in a well bore toward an object previously disposed therein: a cylinder device; a piston device movable in said cylinder device; fluid actuated gripping means for anchoring said cylinder device in the well bore against movement therein; means connected to said piston device and adapted to engage the object to shift the same; cylinder means connected to said cylinder device; piston means movable in said cylinder means; a liquid in said cylinder device and cylinder means engaging said piston device and gripping means and also engaged by said piston means; means for moving said piston means in said cylinder means to apply pressure to said liquid whereby said liquid shifts said gripping means against the well bore and also shifts said piston device in said cylinder device to shift the object, said moving means comprising a cylinder connected to said piston means, a piston in said cylinder connected to said piston means, and means adapted to generate a gas under pressure in said cylinder for relatively moving said piston and cylinder.

17. In apparatus adapted to be lowered in a well bore toward an object previously disposed therein: a cylinder device; a piston device movable in said cylinder device; fluid actuated gripping means for anchoring said cylinder device in the well bore against movement therein; means connected to said piston device and adapted to engage the object to shift the same; cylinder means connected to said cylinder device; piston means movable in said cylinder means; a liquid in said cylinder device and cylinder means engaging said piston device and gripping means and also engaged by said piston means; means adapted to generate a gas under pressure in said cylinder means above said piston means to shift said piston means in said cylinder means and apply pressure to said liquid whereby said liquid shifts said gripping means against the well bore and also shifts said piston device in said cylinder device to shift the object; and releasable means interconnecting said cylinder device and piston device to initially prevent movement of said piston device in said cylinder device and releasable after said gripping means have anchored said cylinder device in the well bore.

References Cited by the Examiner

UNITED STATES PATENTS

| | | | |
|---|---|---|---|
| 2,701,614 | 2/1955 | Ragan et al. | 166—63 |
| 3,045,756 | 7/1962 | Briggs | 166—63 |
| 3,055,430 | 9/1962 | Campbell | 166—122 |
| 3,057,406 | 10/1962 | Patterson et al. | 166—120 |
| 3,088,532 | 5/1963 | Kellner | 175—230 |

CHARLES E. O'CONNELL, *Primary Examiner.*

BENJAMIN HERSH, *Examiner.*